(12) United States Patent
Kim et al.

(10) Patent No.: US 9,467,611 B2
(45) Date of Patent: Oct. 11, 2016

(54) METHOD AND APPARATUS FOR OPERATING CAMERA WITH INTERCHANGEABLE LENS

(71) Applicant: Samsung Electronics Co., Ltd., Gyeonggi-do (KR)

(72) Inventors: Dong-Han Kim, Gyeonggi-do (KR); Jung-Min Yoon, Seoul (KR); Sang-Hyun Chang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 74 days.

(21) Appl. No.: 14/508,973

(22) Filed: Oct. 7, 2014

(65) Prior Publication Data

US 2015/0097983 A1    Apr. 9, 2015

(30) Foreign Application Priority Data

Oct. 7, 2013  (KR) ................. 10-2013-0119452

(51) Int. Cl.
*H04N 5/232* (2006.01)
(52) U.S. Cl.
CPC ................. *H04N 5/23209* (2013.01)
(58) Field of Classification Search
USPC .................................... 348/211.14
See application file for complete search history.

(56) References Cited

U.S. PATENT DOCUMENTS

| | | | | |
|---|---|---|---|---|
| 7,821,562 | B2 * | 10/2010 | Kitada | H04N 1/00307 348/333.02 |
| 8,514,125 | B2 * | 8/2013 | Van Zeijl | G01S 13/10 342/118 |
| 8,692,923 | B2 * | 4/2014 | Yamamoto | H04N 5/23203 348/333.07 |
| 8,749,698 | B2 * | 6/2014 | Yamaya | H04N 5/23209 348/360 |
| 2003/0081504 | A1 * | 5/2003 | McCaskill | G01S 3/8083 367/118 |
| 2003/0137588 | A1 | 7/2003 | Wang et al. | |
| 2004/0041911 | A1 * | 3/2004 | Odagiri | G06F 1/1632 348/207.1 |
| 2005/0122416 | A1 * | 6/2005 | Ryu | H04N 5/23203 348/333.07 |
| 2006/0023070 | A1 | 2/2006 | Nakamura et al. | |
| 2007/0002157 | A1 * | 1/2007 | Shintani | H04N 5/23293 348/333.06 |
| 2007/0098385 | A1 * | 5/2007 | Tanaka | G03B 17/14 396/56 |
| 2007/0126883 | A1 * | 6/2007 | Ishige | H04N 5/23209 348/211.14 |
| 2007/0147815 | A1 | 6/2007 | Tanaka | |
| 2010/0295963 | A1 | 11/2010 | Shintani | |
| 2013/0314581 | A1 * | 11/2013 | Kido | H04N 5/23293 348/333.12 |
| 2014/0104449 | A1 * | 4/2014 | Masarik | H04N 5/2254 348/211.14 |
| 2014/0266900 | A1 * | 9/2014 | Kasher | H04B 7/0617 342/372 |

\* cited by examiner

*Primary Examiner* — Albert Cutler

(57) ABSTRACT

One or more embodiments provide a method and an apparatus for operating an interchangeable-lens camera system suitable for shooting of a high quality photo or moving picture. The camera system includes a main body and a lens unit mountable on and detachable from the main body and wirelessly accessible to the main body. The lens unit estimates position information between the lens unit and the main body using beam information of the lens unit formed via beamforming and beam information of the main body. The lens unit applies the estimated position information to shooting.

24 Claims, 14 Drawing Sheets

METHOD AND APPARATUS FOR OPERATING CAMERA WITH INTERCHANGEABLE LENS

PRIORITY

The present application is related to and claims the benefit under 35 U.S.C. §119 to an application filed in the Korean Intellectual Property Office on Oct. 7, 2013 and assigned Serial No. 10-2013-0119452, the contents of which are incorporated herein by reference.

TECHNICAL FIELD

The present disclosure relates to a camera with an interchangeable lens.

BACKGROUND

As a communication technology develops recently, an interchangeable-lens camera or a camera with an interchangeable lens is brought to the market. Since an interchangeable-lens camera supports a wireless access function, it enables shooting of a photo and a moving picture even when a main body and a lens unit are physically separated. The main body and the lens unit have a wireless module for wireless connection between them. This wireless module needs to be determined with consideration of a photo to be exchanged between the main body and the lens unit, or a bandwidth of a moving picture.

SUMMARY

To address the above-discussed deficiencies, it is a primary object to provide a method and an apparatus for operating an interchangeable-lens camera system suitable for shooting of a high-quality photo or moving picture.

Another aspect of the present disclosure is to provide a method and an apparatus for estimating a relative position between a camera main body and a lens unit in an interchangeable-lens camera system.

Still another aspect of the present disclosure is to provide a method and an apparatus for estimating a relative position between a camera main body and a lens unit and applying this estimated information to shooting in an interchangeable-lens camera system.

In accordance with an aspect of the present disclosure, one or more embodiments provide a method for operating a lens unit in a camera system including a main body, and the lens unit mountable on and detachable from the main body and wirelessly accessible to the main body. The method includes estimating position information between the lens unit and the main body using beam information of the lens unit and beam information of the main body formed via beamforming, and applying the estimated position information to shooting.

In accordance with another aspect of the present disclosure, one or more embodiments provide a method for operating a main body in a camera system including the main body, and a lens unit mountable on and detachable from the main body and wirelessly accessible to the main body. The method includes receiving image data shot by the lens unit, estimating position information between the lens unit and the main body using beam information of the lens unit and beam information of the main body formed via beamforming, and converting the received image data based on the estimated position information.

In accordance with still another aspect of the present disclosure, one or more embodiments provide an apparatus of a lens unit in a camera system including a main body, and the lens unit mountable on and detachable from the main body and wirelessly accessible to the main body. The apparatus includes a position information estimator for estimating position information between the lens unit and the main body using beam information of the lens unit and beam information of the main body formed via beamforming, and a shooting controller for applying the estimated position information to shooting.

In accordance with yet another aspect of the present disclosure, one or more embodiments provide an apparatus of a main body in a camera system including the main body, and a lens unit mountable on and detachable from the main body and wirelessly accessible to the main body. The apparatus includes a receiver for receiving image data shot by the lens unit, a position information estimator for estimating position information between the lens unit and the main body using beam information of the lens unit and beam information of the main body formed via beamforming, and an image conversion processor for converting the received image data based on the estimated position information.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1A through 12, discussed below, and the various embodiments used to describe the principles of the present disclosure in this patent document are by way of illustration only and should not be construed in any way to limit the scope of the disclosure. Those of ordinary skill in the art will understand the principles of the present disclosure may be implemented in any certain wireless communication system appropriately arranged.

Figure 1A:
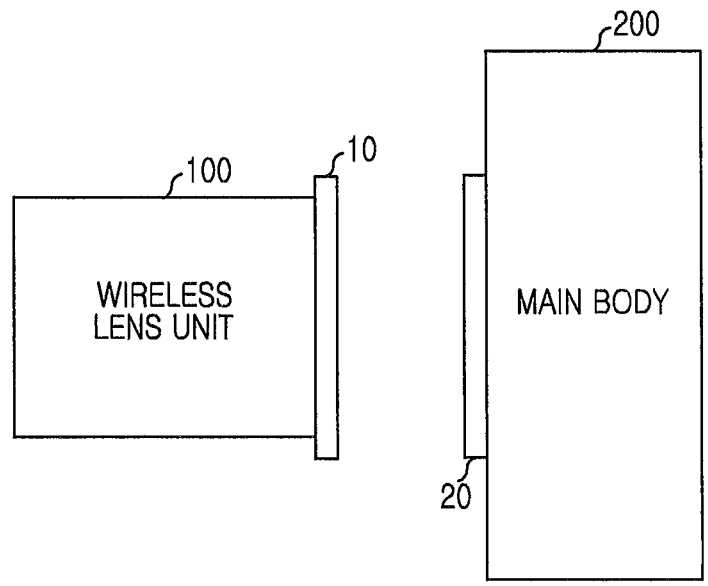
FIGS. 1A and 1B illustrate a connection configuration of an interchangeable-lens camera system to which the present disclosure is applied.
Figure 1B:
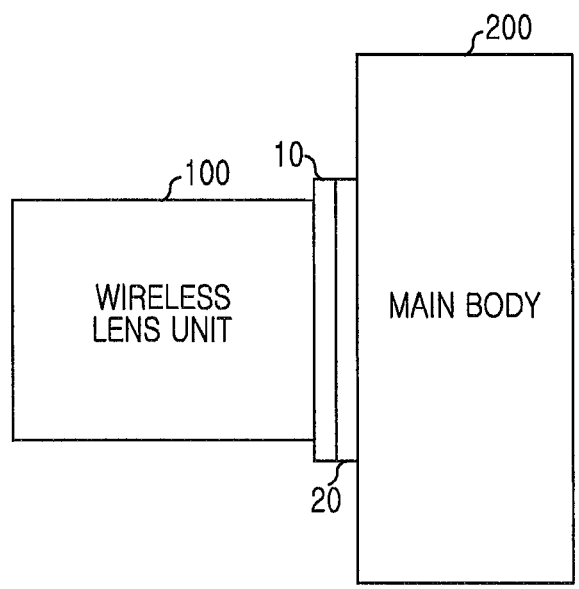

Embodiments of the present disclosure to be described below relate to an interchangeable-lens camera where a wireless lens and a main body may be separated. As illustrated in FIGS. 1A and 1B, an interchangeable-lens camera includes a wireless lens unit 100 and a main body 200. The wireless lens unit 100 and the main body 200 may be connected with each other via a wireless module provided inside to control and transmit data. Therefore, the wireless lens unit 100 and the main body 200 enable shooting of a photo and a moving picture in a state where the wireless lens unit 100 and the main body 200 are separated (FIG. 1B) as well as in a state the wireless lens unit 100 and the main body 200 are coupled to each other via respective mounts 10 and 20 (FIG. 1A). In another embodiment, the wireless lens unit 100 may be paired with an apparatus having a display and a wireless access function such as a smartphone, a television (TV), a laptop computer, a tablet computer, and the like. A smart camera including a wireless module may be paired to these apparatuses.

For the camera main body 200 and the wireless lens unit 100 to be wirelessly connected and enable photo shooting and lens control, a wireless module could be included inside the main body 200 and the wireless lens unit 100. At this point, the wireless module may be determined with consideration of a photo exchanged between the lens unit 100 and the main body 200, and a bandwidth of a moving picture. For example, the wireless module may use a Wireless Fidelity (Wi-Fi) scheme. When an interchangeable-lens camera transmits a photo and a moving picture in their compressed state, a bandwidth is not used much, such that Wi-Fi may be used as a wireless link.

However, the Wi-Fi wireless link is not suitable for transmission of a high-quality photo and a moving picture of a High/Ultra Definition grade. Therefore, an embodiment of the present disclosure to be described later proposes use of a wireless module of a Giga-bps grade that uses a millimeter wave. Also, since millimeter wave communication has short coverage due to attenuation, an embodiment of the present disclosure increases performance using a beamforming technology. Also, an embodiment of the present disclosure extracts beam patterns of transmission/reception ends via beamforming, and estimates relatively accurately a relative position, direction, and distance between transmission/reception ends using this extracted beam patterns. Since a millimeter wave has a short wavelength and a wide bandwidth of a signal, an exact or substantially exact distance between transmission/reception ends may be obtained via calculation of a round trip delay (RTD) between the transmission/reception ends. Also, an embodiment of the present disclosure provides convenience in manipulation when a user takes a photograph and shoots a moving picture by applying estimation information for a relative position (direction and distance) between a wireless lens unit and a main body. For example, when a wireless lens unit and a main body face each other, since the wireless lens unit is in a self-portrait state that shoots a person who holds the main body, an embodiment of the present disclosure reverses left and right of a preview image displayed in the main body and displays the same, and also allows an image processor/filter setting, and the like suitable for self-portrait to be automatically performed. Also, an embodiment of the present disclosure focuses on an image accurately even without performing separate image processing by estimating a relative position between the main body and the wireless lens unit.

Figure 2:
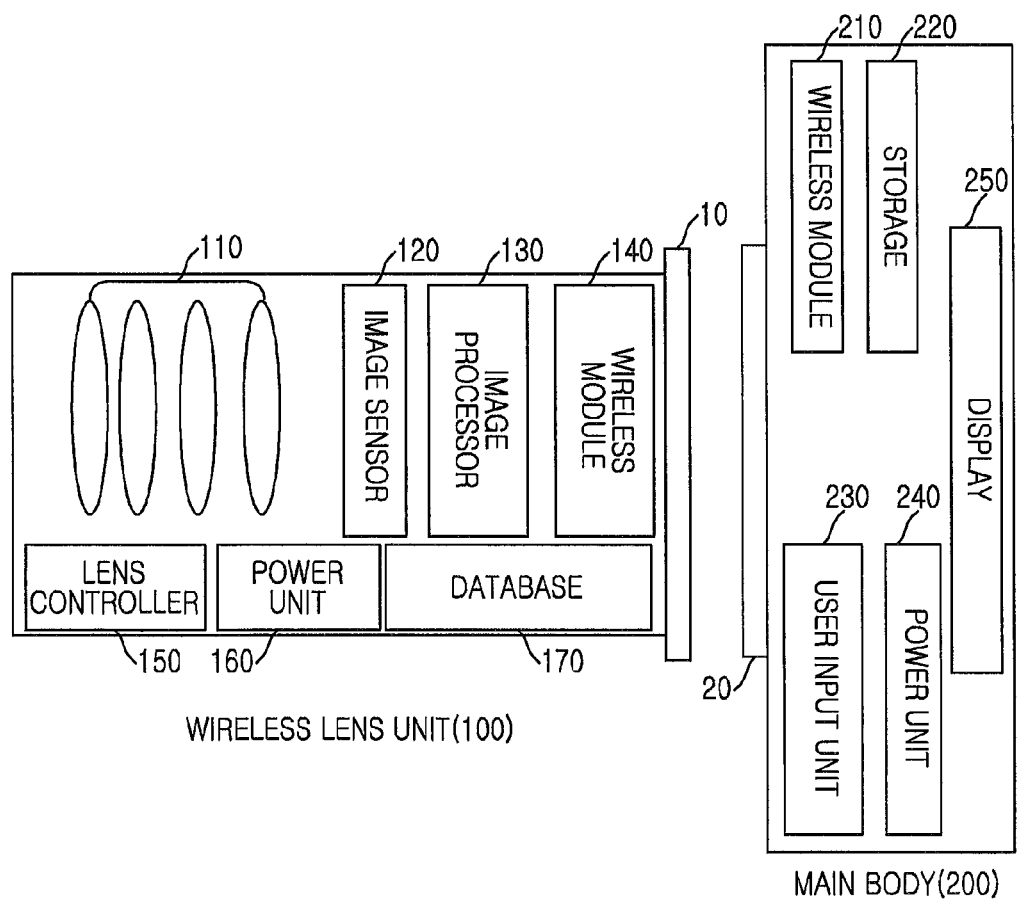
FIG. 2 illustrates a configuration of a wireless lens unit and a main body forming an interchangeable-lens camera system according to an embodiment of the present disclosure.

FIG. 2 illustrates a configuration of a wireless lens unit 100 and a main body 200 forming an interchangeable-lens camera system according to an embodiment of the present disclosure. The wireless lens unit 100 and the main body 200 include mounts 10 and 20, respectively. The wireless lens unit 100 and the main body 200 may be coupled and separated via the mounts 10 and 20. To enable shooting of a photo and a moving picture even in a state where the wireless lens unit 100 and the main body 200 are separated, wireless modules 140 and 210 wireless connecting them are included inside the wireless lens unit 100 and the main body 200, respectively.

The wireless lens unit 100 includes a plurality of lens 110, an image sensor 120, an image processor 130, a wireless module 140, a lens controller 150, a power unit 160, and a database 170. The power unit 160 supplies power to respective elements of the wireless lens unit 100. The lens controller 150 controls setting for shooting of a photo and a moving picture for lenses 100. For example, the lens controller 150 controls auto-focus, zoom, an aperture, and the like. The image sensor 120 converts light received via lenses 110 to an electric signal. The image processor 130 image-processes data received from the image sensor 120. For example, the image processor 130 removes noise of received data and converts the data such that they are suitable for photo and moving picture formats. The database 170 stores information used for shooting of a photo and a moving picture. For example, when a lens is a zoom lens having a focal length of various ranges, the database 170 may store a field of view suitable for each focal length. For another example, the database 170 may store a focal length corresponding to a distance between the lens unit 100 and the main body 200 and a control value of an optical lens corresponding to the focal lens. For another example, the database 170 may store exposure (aperture, shutter) suitable for self-portrait, a digital filter effect, and the like. Information stored in the database 170 is used for determining a relative direction between the wireless lens unit 100 and the main body 200 using beam patterns of the wireless lens unit 100 and the main body 200.

The wireless module 140 transmits an image of a photo and a moving picture shot by the lenses 110 and then processed by the image processor 130 to the main body 200. Also, the wireless module 140 transmits control data to the main body 200, and receives control data from the main body 200. For example, the wireless module 140 transmits/receives a ranging packet for distance measurement, ACK, a packet, beam pattern information, and the like to/from the main body 200.

The main body 200 includes a wireless module 210, a storage 220, a user input unit 230, a power unit 240, and a display 250. The wireless module 210 receives image data of a photo and a moving picture transmitted from the wireless lens unit 100. Also, the wireless module 210 transmits control data to the lens unit 100, and receives control data from the lens unit 100. For example, the wireless module 210 transmits/receives a ranging packet for distance measurement, ACK, a packet, beam pattern information, and the like to/from the lens unit 100. The storage 220 stores image data of a photo and a moving picture. The display 250 displays a photo and a moving picture to allow a user to preview/review the photo and the moving picture. The user input unit 230 may receive an input from a user.

Wireless modules 140 and 210 included in the wireless lens unit 100 and the main body 200 may be determined with consideration of a maximum bandwidth of a photo and moving picture data transmitted via a wireless link. With consideration of a recent camera development tendency and a technology development speed, to transmit high quality photo and video of High/Ultra definition, a 3 dimensional (D) image, and the like, it is suitable to use a wireless module of Giga-bps grade. For example, IEEE 802.11ad, Wireless HD, and the like, which are current Giga-bps data transmission wireless communication standards, may be applied. A Giga-bps data transmission standard such as IEEE 802.11ad and Wireless HD uses a millimeter-wave in a band of 60 GHz. Since a millimeter wave has strong directionality and large path lass depending on a distance, it is possible to increase communication performance using a beamforming technology. The beamforming technology is a technology for enabling communication under a high Signal-to Noise Ratio (SNR) circumstance by finding out an optimized beam between a wireless module of a transmission end and a wireless module of a reception end using a phased-array antenna, and transmitting a signal via a formed beam.

Figure 3A:
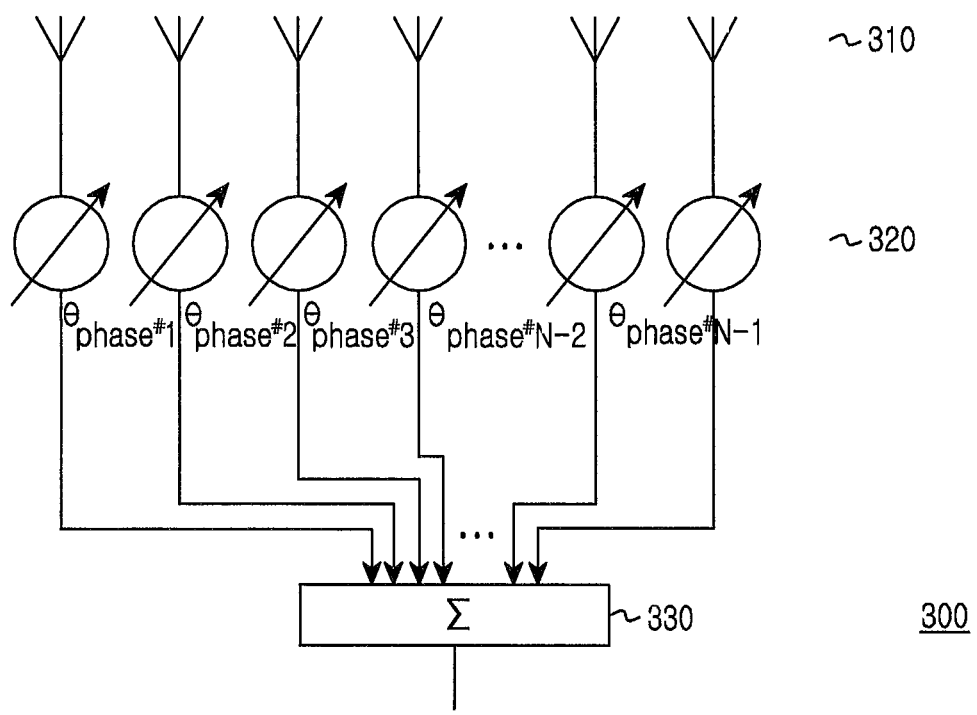
FIGS. 3A and 3B illustrate configuration examples of a phased-array antenna included in a millimeter wave wireless module according to an embodiment of the present disclosure.
Figure 3B:
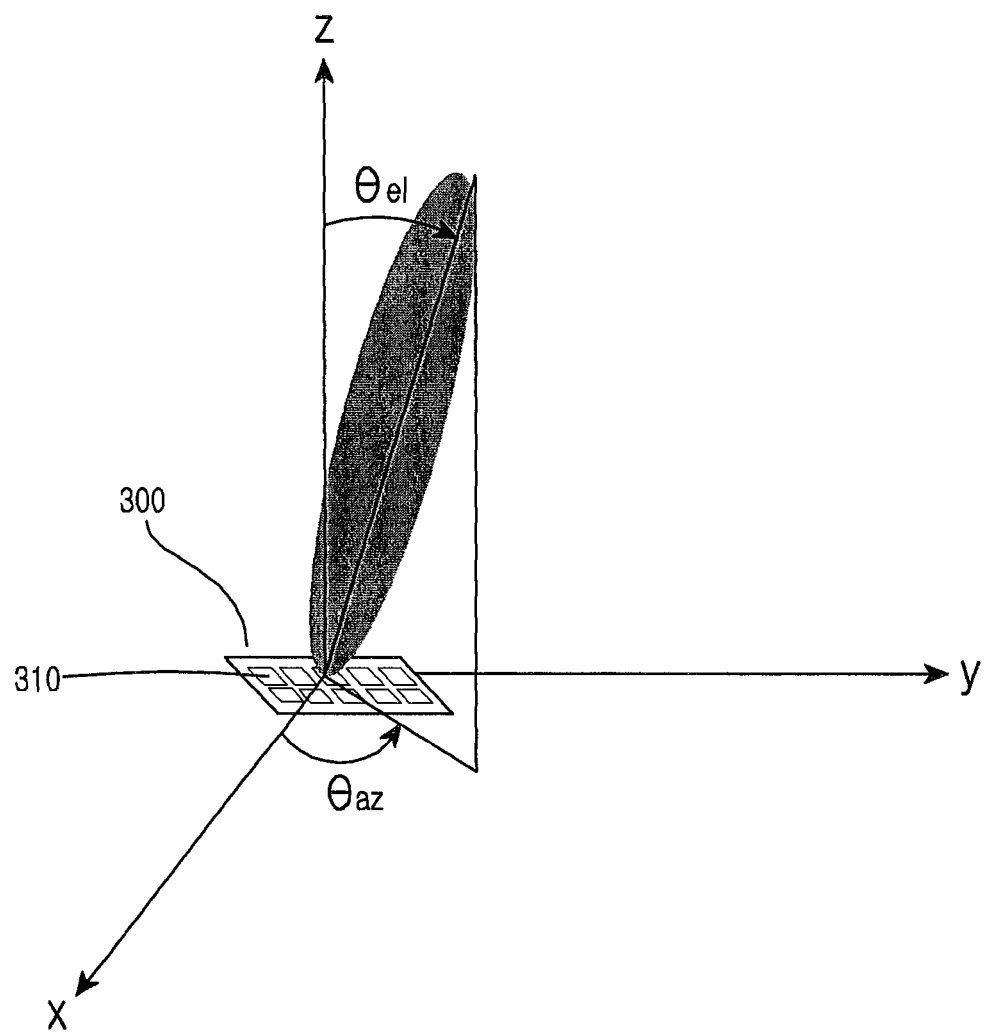

FIGS. 3A and 3B illustrate configuration examples of a phased-array antenna included in a millimeter wave wireless module according to an embodiment of the present disclosure.

Referring to FIG. 3A, the phased-array antenna 300 includes a plurality of single antennas 310, a plurality of phase shifters 320, and a combiner 330. It is possible to allow a beam having a high SNR in a desired direction to be formed by controlling and combining phases of signals received via the plurality of antennas 310.

Referring to FIG. 3B, the phased-array antenna 300 is configured by arranging a plurality of antennas 310 on a 2-dimensional X-Y plane. A beam is formed by one of the plurality of antennas 310. Since a millimeter wave wireless communication scheme has an advantage of making an antenna small, the phased-array antenna 300 configured by the plurality of single antennas 310 on 2-dimension is used. A beam formed by the phased-array antenna 300 has an elevation angle $\theta_{el}$ with respect to a z-axis, and an azimuth angle $\theta_{az}$ with respect to an x-axis. It is possible to properly design an elevation angle and an azimuth angle such that beams corresponding to a plurality of antennas 310 cover all angles and the beams do not overlap each other, and allow a corresponding beamforming operation to be performed.

A beamforming operation may be performed by various algorithms. An embodiment of the present disclosure uses an algorithm of selecting a beam pattern having an optimized performance by measuring transmission/reception power, Signal to Noise Ratio (SNR), and the like while changing and transmitting/receiving a predetermine beam pattern. When beamforming is completed, it is possible to know a relative direction or position between a current transmission wireless module (or reception wireless module) and a reception wireless module (or transmission wireless module) connected thereto by determining art elevation angle and a azimuth angle corresponding to a selected beam pattern.

Figure 4A:
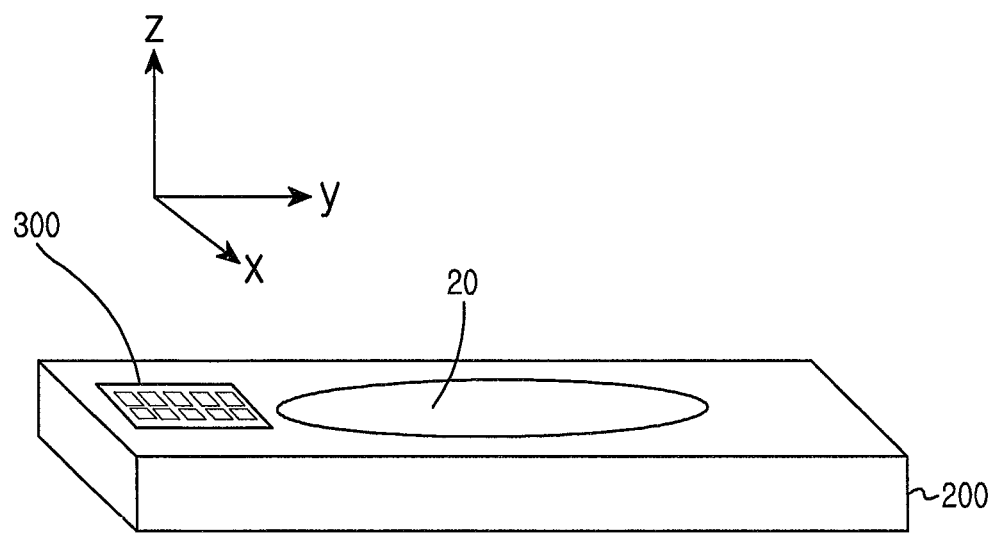
FIGS. 4A and 4B illustrate mounting examples of a phased-array antenna according to an embodiment of the present disclosure.
Figure 4B:
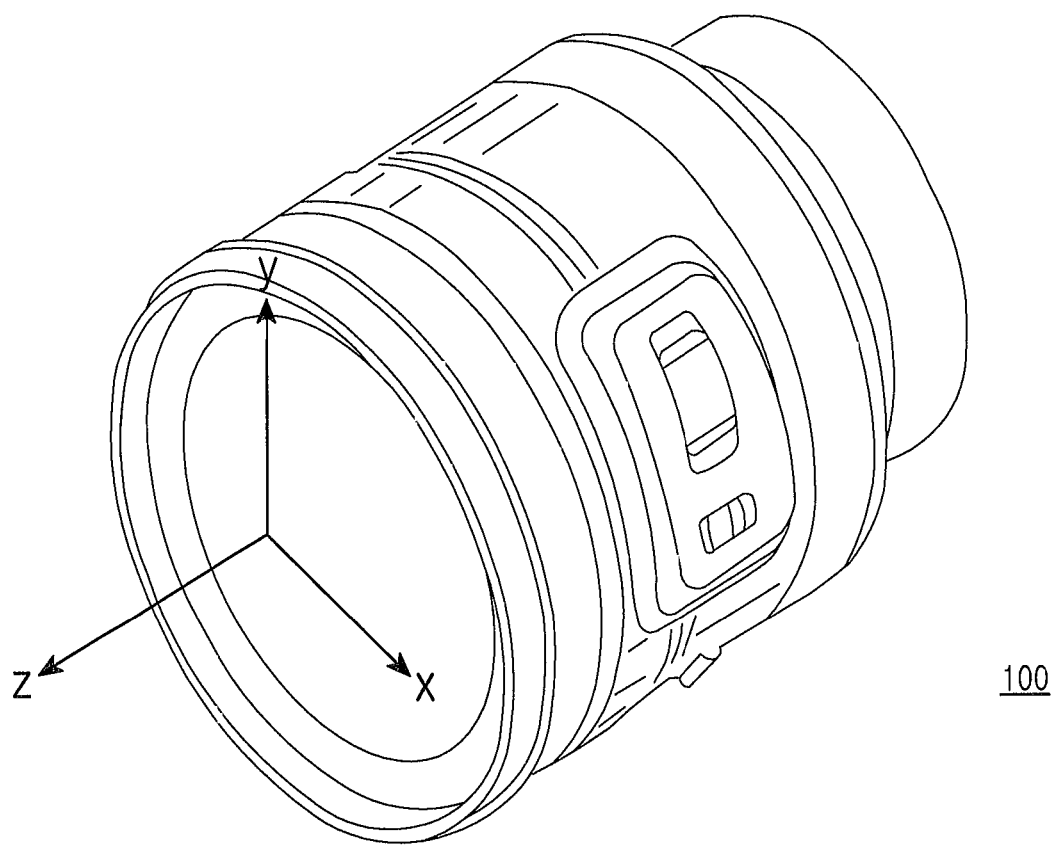

FIGS. 4A and 4B illustrate mounting examples of a phased-array antenna according to an embodiment of the present disclosure. For example, when the main body, as illustrated in FIG. 4A, a phased-array antenna 300 may be mounted in a direction where a mount 20 faces a z-axis. In situation of a lens, as illustrated in FIG. 4B, the phased-array antenna 300 may be mounted in a direction which a lens faces. A mounting example illustrated in the drawing is exemplary, and the phased array antenna may be mounted in various directions and positions of the camera main body 200 and the lens unit 100 without limitation of performance and implementation.

Figure 5:
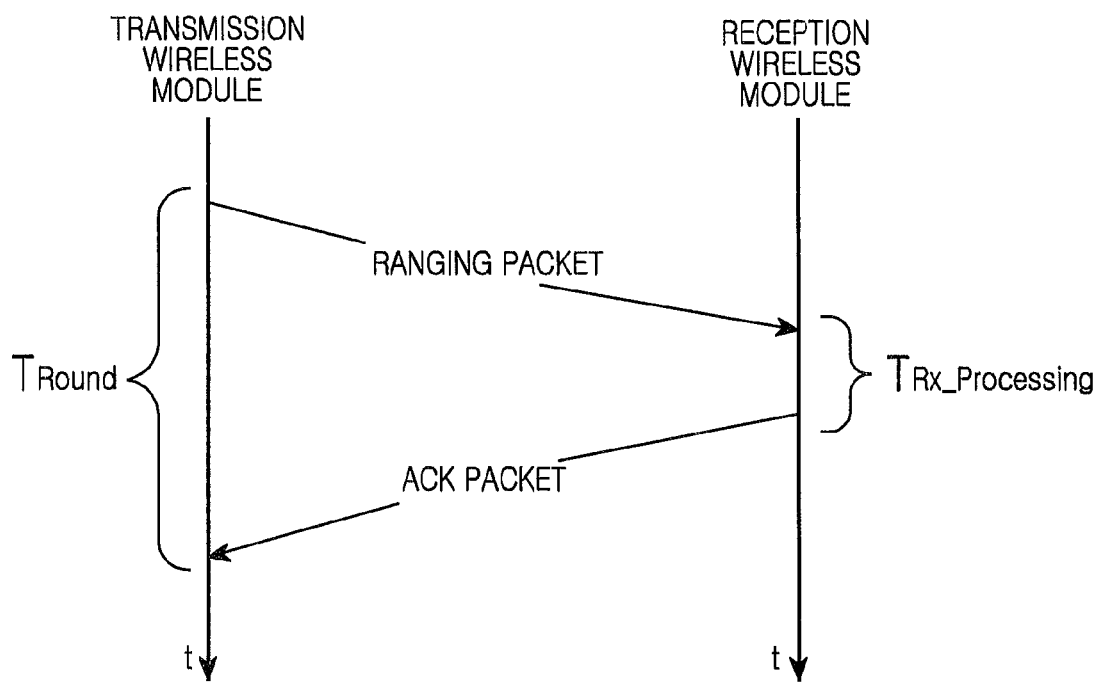
FIG. 5 illustrates an operation of measuring a distance between a wireless lens unit and a main body according to an embodiment of the present disclosure.

FIG. 5 illustrates an operation of measuring a distance between a wireless lens unit and a main body according to an embodiment of the present disclosure. Since wireless communication that uses a millimeter wave having high carrier frequency and high sampling frequency, it is useful in measuring a distance between a transmission wireless module and a reception wireless module. As illustrated in FIG. 5, a transmission wireless module transmits a ranging packet for distance measurement. A reception wireless module receives a ranging packet, and transmits an ACK packet as a response signal thereto. Then, a distance between the transmission wireless module and the reception wireless module may be measured by Equation (1).

$$\text{Distance}(m) = \frac{1}{2} * (T_{Round} - T_{Rx\_processing}) * C_{light} \quad (1)$$

In Equation (1), $T_{Round}$ is a time difference between a point of transmitting a distance measurement packet and a point of receiving a response packet at the transmission module, $T_{Rx\_Processing}$ is a time difference between a point of receiving a distance measurement packet and a point of transmitting a response packet at the reception module, and $C_{light}$ is a velocity of light. A distance measurement operation may be implemented by transmitting a ranging packet in any of the wireless lens unit 100 and the main body 200. For example, the wireless lens unit 100 illustrated in FIGS. 1A and 1B may be a transmission wireless module, and the main body 200 may be a reception wireless module. For another example, the wireless lens unit 100 may be a reception wireless module, and the main body 200 may be a transmission wireless module.

As described above, it is possible to measure a relative position and direction, and a distance between the wireless lens unit 100 and the main body 200 by incorporating a millimeter wave wireless module inside the wireless lens unit 100 and the main body 200, and allowing the millimeter wave wireless module to support beamforming. This measurement result may be applied to shooting of a photo and a moving picture. Though the wireless lens unit 100 and the main body 200 exemplarily use the millimeter wave wireless module in order to measure the relative position, direction, and distance between the wireless lens unit 100 and the main body 200, the scope of the present disclosure is not limited thereto. For example, when a wireless module supporting beamforming is used though it is not the millimeter wave wireless module, it is possible to measure the relative position, direction, and distance between the wireless lens unit 100 and the main body 200. Also, the main body 200 forming the present disclosure may be implemented by a TV, a smartphone, a laptop computer, and the like including a display, a user manipulation unit, and a wireless module applying beamforming as well as the camera main body. Also, the wireless lens unit 100 forming the present disclosure may be implemented by a camera capable of transmitting a shot photo and moving picture to the main body 200.

Figure 6:
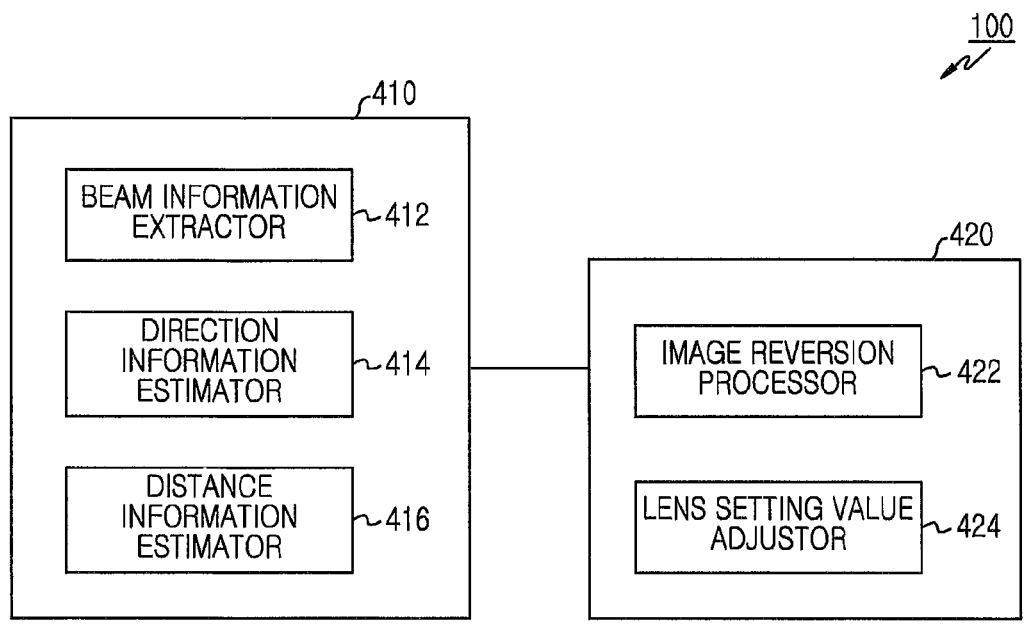
FIG. 6 illustrates functional block diagram of a wireless lens unit according to an embodiment of the present disclosure.

FIG. 6 illustrates a functional block diagram of a wireless lens unit according to an embodiment of the present disclosure. For example, the configuration illustrated in FIG. 6 may be configuration of the wireless lens unit 100 illustrated in FIGS. 1A and 1B. The configuration illustrated in FIG. 6 is provided for an example purpose only, and other embodiments may be used without departing from the scope of the present disclosure.

Referring to FIG. 6, the wireless lens unit 100 includes a position information estimator 410 and a shooting controller 420. In an embodiment, the position information estimator 410 may be implemented by the wireless module 140 illustrated in FIG. 2 and a processor (not shown), and the like. In an embodiment, the shooting controller 420 may be implemented by the image processor 130 and the lens controller 150 illustrated in FIG. 2, and the like.

The position information estimator 410 estimates position information between the lens unit 100 and the main body 200 using beam information of the lens unit 100 and beam information of the main body 200 formed via beamforming. The position estimator 410 includes a beam information extractor 412, a direction information estimator 414, and a distance information estimator 416. The beam information extractor 412 extracts beam information of the lens unit 100. The direction information estimator 414 estimates direction information between the lens unit 100 and the main body 200 based on extracted beam information of the lens unit 100 and beam information of the main body received from the main body 200. In an embodiment, the direction information estimator 414 estimates direction information estimates direction information between the lens unit 100 and the main body 200 based on an elevation angle of beams formed by the lens unit 100 and the main body 200. In an embodiment, when an elevation angle of a beam formed by the lens unit 100 exists within a range of a field of view corresponding to the focal length of the lens unit 100, and an elevation angle of a beam formed by the main body 200 is less than a predetermined angle (e.g., 90°), the direction information estimator 414 estimates that the lens unit 100 and the main body 200 face each other. In an embodiment, the distance information estimator 416 estimates a distance between the lens unit 100 and the main body 200 by calculating a round trip delay between the lens unit 100 and the main body 200.

The shooting controller 420 applies position information estimated by the position information estimator 410 to shooting. The shooting controller 420 includes an image reversion processor 422 and a lens setting value adjustor 424. When estimation position information represents the lens unit 100 and the main body 200 face each other, the image reversion processor 422 reverses the left and right of a shot image. When estimated position information represents the lens unit 100 and the main body 200 face each other and a distance between the lens unit 100 and the main body 200 is closer than a predetermined distance, the lens setting value adjuster 424 controls a setting value of a lens for image shooting. In an embodiment, the lens setting value adjuster 424 controls at least one of exposure, a digital filter effect, and auto focusing.

Figure 7:
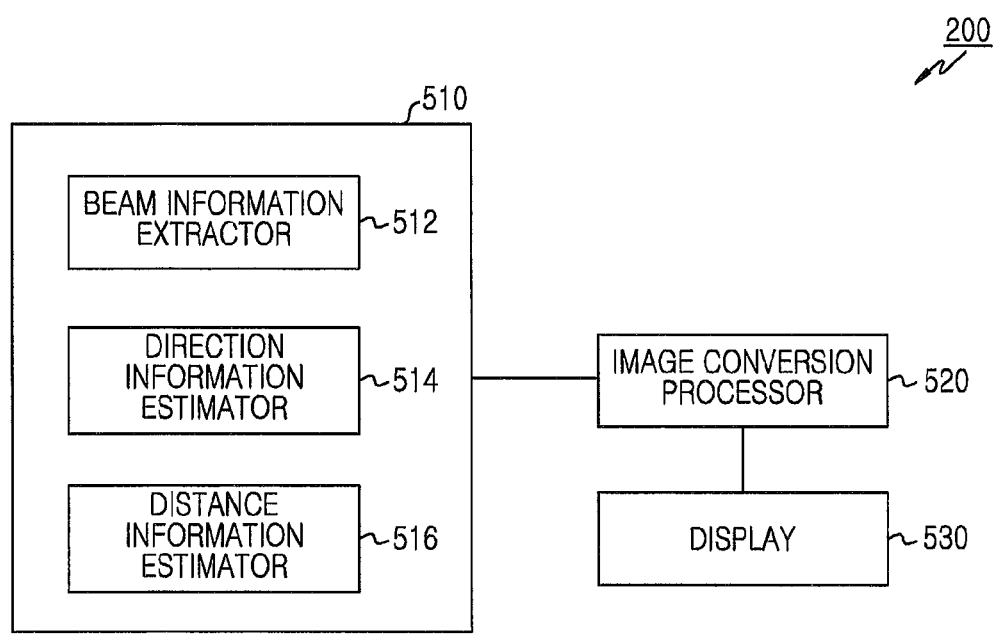
FIG. 7 illustrates functional block diagram of a main body according to an embodiment of the present disclosure.

FIG. 7 illustrates a functional block diagram of a main body according to an embodiment of the present disclosure. For example, the configuration illustrated in FIG. 7 may be configuration of the main body 200 illustrated in FIGS. 1A and 1B. The configuration illustrated in FIG. 7 is provided for an example purpose only, and other embodiments may be used without departing from the scope of the present disclosure.

Referring to FIG. 7, the main body 200 includes a position information estimator 510, an image conversion processor 520, and a display 530. In an embodiment, the position information estimator 510 may be implemented by the wireless module 210 illustrated in FIG. 2 and a processor (not shown), and the like. In an embodiment, the image conversion processor 520 may be implemented by a processor (not shown), and the like.

The position information estimator 510 estimates position information between the lens unit 100 and the main body 200 using beam information of the lens unit 100 and beam information of the main body 200 formed via beamforming. The position information estimator 510 includes a beam information extractor 512, a direction information estimator 514, and a distance information estimator 516. The beam information extractor 512 extracts beam information of the main body 200. The direction information estimator 514 estimates direction information between the lens unit 100 and the main body 200 based on beam information of the main body extracted by the beam information extractor 512 and beam information of the lens unit 100 received via a receiver (not shown). In an embodiment, the direction information estimator 514 estimates direction information between the lens unit 100 and the main body 200 based on an elevation angle of beams formed by the lens unit 100 and the main body 200. In an embodiment, when an elevation angle of a beam formed by the lens unit 100 exists within a range of a field of view corresponding to the focal length of the lens unit 100, and an elevation angle of a beam formed by the main body 200 is less than a predetermined angle (e.g., 90°), the direction information estimator 514 estimates that the lens unit 100 and the main body 200 face each other. The distance information estimator 516 estimates a distance between the lens unit 100 and the main body 200 by calculating a round trip delay between the lens unit 100 and the main body 200.

The image conversion processor 520 converts image data received via a receiver (not shown) based on estimated position information. The received image data is image data of a photo and a moving picture shot by the lens unit 100. In an embodiment, when estimated position information represents that the lens unit 100 and the main body 200 face each other, the image conversion processor 520 reverses the left and right of a shot image. The left and right-reversed images are displayed on the display 530.

Figure 8:
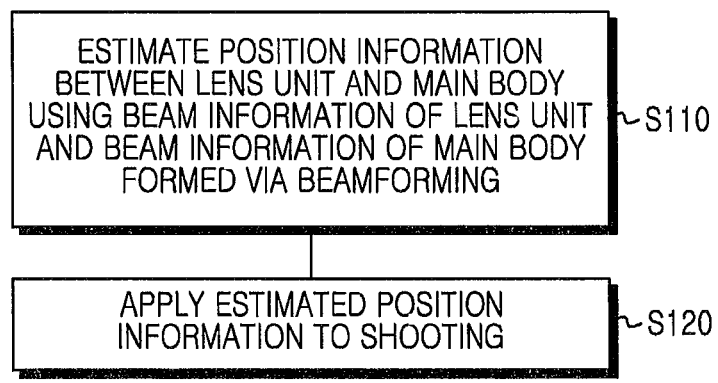
FIG. 8 illustrates a process of an operation flow of a wireless lens unit according to an embodiment of the present disclosure.

FIG. 8 illustrates a process of a wireless lens unit according to an embodiment of the present disclosure. For example, the process illustrated in FIG. 8 may be an operation flow of the wireless lens unit 100 illustrated in FIGS. 1A and 1B. The process illustrated in FIG. 8 is provided for an example purpose only, and other embodiments may be used without departing from the scope of the present disclosure.

Referring to FIG. 8, in block S110, the lens unit 100 estimates position information between the lens unit 100 and the main body 200 using beam information of the lens unit 100 and beam information of the main body 200 formed via beamforming.

Block S110 includes a process of extracting beam information of the lens unit 100, and a process of estimating direction information between the lens unit 100 and the main body 200 based on beam information of the extracted lens unit 100 and beam information of the main body 200 received from the main body 200. In an embodiment, the process of estimating direction information between the lens unit 100 and the main body 200 includes estimating direction information between the lens unit 100 and the main body 200 based on an elevation angle of beams formed by the lens unit 100 and the main body 200. For example, when an elevation angle of a beam formed by the lens unit 100 exists within a range of a field of view corresponding to the focal length of the lens unit 100, and an elevation angle of a beam formed by the main body 200 is less than a predetermined angle (e.g., 90°), it is estimated that the lens unit 100 and the main body 200 face each other. Block S110 may further include a process of estimating distance information between the lens unit 100 and the main body 200. In an embodiment, distance information between the lens unit 100 and the main body 200 is estimated by calculating a round trip delay between the lens unit 100 and the main body 200.

In block S120, the lens unit 100 applies estimated position information to shooting. In an embodiment, when the estimated position information represents the lens unit 100 and the main body 200 face each other, block S120 includes a process of reversing the left and right of a shot image. In another embodiment, when the estimated position information represents that the lens unit 100 and the main body 200 face each other and a distance between the lens unit 100 and the main body 200 is closer than a predetermined distance, block S120 includes a process of adjusting a setting value of a lens for image shooting. For example, a setting value of a lens may be at least one of exposure, a digital filter effect, and auto focusing.

Figure 9:
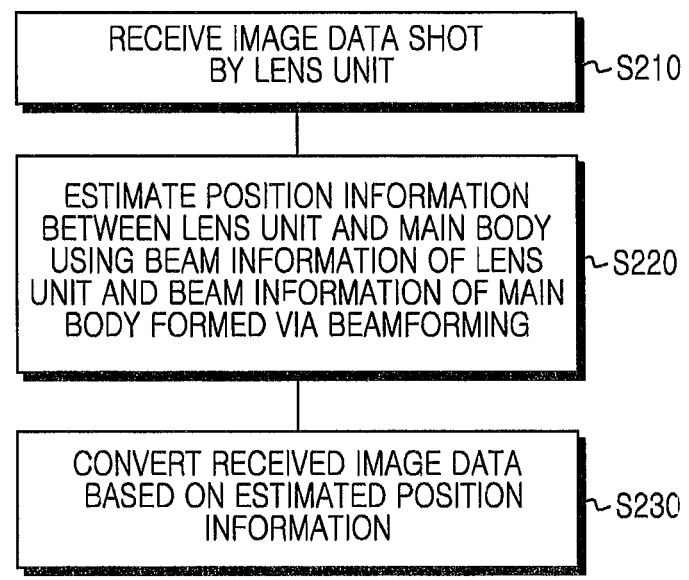
FIG. 9 illustrates a process of an operation flow of a main body according to an embodiment of the present disclosure.

FIG. 9 illustrates a process of a main body according to an embodiment of the present disclosure. For example, the process illustrated in FIG. 9 may be an operation flow of the main body 200 illustrated in FIGS. 1A and 1B. The process illustrated in FIG. 9 is provided for an example purpose only, and other embodiments may be used without departing from the scope of the present disclosure.

Referring to FIG. 9, in block S210, the main body 200 receives image data shot by the lens unit 100. In block S220, the main body 200 estimates position information between the lens unit 100 and the main body 200 using beam information of the lens unit 100 and beam information of the main body 200 formed via beamforming. In block S230, the main body 200 converts received image data based on the estimated position information.

Block S220 includes a process of extracting beam information of the main body 200, a process of receiving beam information of the lens unit 100 from the lens unit 100, and a process of estimating direction information between the lens unit 100 and the main body 200 based on the extracted beam information of the main body 200 and the received beam information of the lens unit 100. Block S220 may further include a process of estimating distance information between the lens unit 100 and the main body 200.

In an embodiment, the direction information between the lens unit 100 and the main body 200 is estimated based on an elevation angle of beams formed by the lens unit 100 and the main body 200. For example, when an elevation angle of a beam formed by the lens unit 100 exists within a range of a field of view corresponding to the focal length of the lens unit 100, and an elevation angle of a beam formed by the main body 200 is less than a predetermined angle (e.g., 90°), it is estimated that the lens unit 100 and the main body 200 face each other. In an embodiment, distance information between the lens unit 100 and the main body 200 is estimated by calculating a round trip delay between the lens unit 100 and the main body 200.

In an embodiment, when the estimated position information represents the lens unit 100 and the main body 200 face each other, block S230 reverses the left and right of a shot image. The left and right-reversed images are displayed.

According to an embodiment of the present disclosure, when power is applied to the wireless lens unit 100 and the main body 200, they are connected via a wireless link. Next, as illustrated in FIG. 5, the main body 200 transmits control signaling as a ranging packet to the wireless lens unit 100 via the wireless link. Then, the wireless lens unit 100 transmits ACK signaling, a photo, and a moving picture data signal to the main body 200. When the wireless lens unit 100 and the main body 200 are coupled to each other, since the wireless lens unit 100 and the main body 200 know in advance a relative direction between wireless modules, the wireless lens unit 100 and the main body 200 may perform wireless communication via a predetermined beam without performing beamforming.

Unlike this, when the wireless lens unit 100 and the main body 200 are separated from each other, since beam directions of the wireless modules included in the wireless lens unit 100 and the main body 200 may change, they perform beamforming in order to maintain an optimized communication state. When both the wireless lens unit 100 and the main body 200 perform beamforming, a specific beam pattern for each of the wireless lens unit 100 and the main body 200 is extracted. Therefore, an elevation angle $\theta_{el\_Lens}$ and an azimuth angle $\theta_{az\_Lens}$ formed by the wireless module 140 of the wireless lens unit 100, and an elevation angle $\theta_{el\_Body}$ and an azimuth angle $\theta_{az\_Body}$ formed by the wireless module 210 of the main body 200 may be derived.

When $\theta_{el\_Lens}$ of a beam formed by the wireless lens unit 100 exists within the range of a field of view of the lens unit 100, it is determined that the main body 200 is included in a photo and an image shot by the lens unit 100. That is, when $\theta_{el\_Lens} < \theta_{FOV}(d)$ is satisfied, it is determined that the main body 200 is included in a photo and an image shot by the wireless lens unit 100. Here, d is a focal length of a current lens, and $\theta_{FOV}(d)$ is a field of view corresponding to the focal length. Information regarding the focal length of the lens and a field of view corresponding to the focal length may be stored in a database 170 of the lens unit 100 in advance.

When an elevation angle $\theta_{el\_Body}$ of a beam formed by the wireless module 210 of the main body 200 does not exceed an angle 90° in a state of $\theta_{el\_Lens} < \theta_{FOV}(d)$, it corresponds to a state where a user shoots himself using the wireless lens unit 100 while the wireless lens unit 100 and the main body 200 face each other. That is, when $\theta_{el\_Body} < 90°$ with $\theta_{el\_Lens} < \theta_{FOV}(d)$, it is a state where shooting is performed while the wireless lens unit 100 and the main body 200 face each other.

The above-estimated information regarding a relative direction between the wireless lens unit 100 and the main body 200 may be applied to shooting of a photo and a moving picture. Also, the above-described estimated information regarding a distance between the wireless lens unit 100 and the main body 200 may be applied to shooting of a photo and a moving picture.

Hereinafter, examples of applying estimated information regarding a relative direction and distance between the wireless lens unit 100 and the main body 200 are described.

According to an embodiment, when it is determined shooting is performed while the wireless lens unit 100 and the main body 200 face each other, when an image transmitted by the wireless lens unit 100 is previewed, the displayed image is reversed left and right. When the wireless lens unit 100 and the main body 200 face each other, when a previewed moving picture is not reversed left and right, an image which a user views via a display 250 of the main body 200 and an actually viewed image are seen as if it were reversed left and right, such that confusion may occur during shooting of a photo. Therefore, a preview moving picture is reversed left and right, such that the user may perform photo shooting without difficulty.

According to another embodiment, when a distance gets close in a shooting state while the wireless lens unit 100 and the main body 200 face each other, a current photo shooting state may be determined as a self-portrait state. A distance D that determines self-portrait may be an initial value designed upon implementation or may be arbitrarily determined by a user in advance. When the wireless lens unit 100 determines a current photo shooting state as self-portrait, it may apply setting values such as exposure (aperture, shutter), a digital filter effect, and the like suitable for the self-portrait. Exposure and a digital filter effect may be set in advance and stored in a memory upon implementation, and a user may change a desired setting. When determining self-portrait, the wireless lens unit 100 may load the setting values stored in the memory or the database 170 and apply the same to the lens 110 via the lens controller 150.

According to still another embodiment, when the wireless lens unit 100 and the main body 200 are in a relation of $\theta_{el\_Lens} < \theta_{FOV}(d)$, it is possible to control auto focusing of the lens 110 based on a measured distance between the wireless lens unit 100 and the main body 200. A focal length corresponding to a distance between the wireless lens unit 100 and the main body 200 and a corresponding control value of the optical lens 110 are stored in the database 170 of the wireless lens unit 100, and it is possible to control auto focusing by reading a control value corresponding to a distance and controlling the optical lens 110 via the lens controller 130. In an existing auto focusing technology, focusing fails when there is no difference in color or brightness of a background and an object, but in an auto focusing technology according to an embodiment of the present disclosure, auto focusing may be implemented regardless of a difference in color or brightness of an object and a background.

Figure 10:
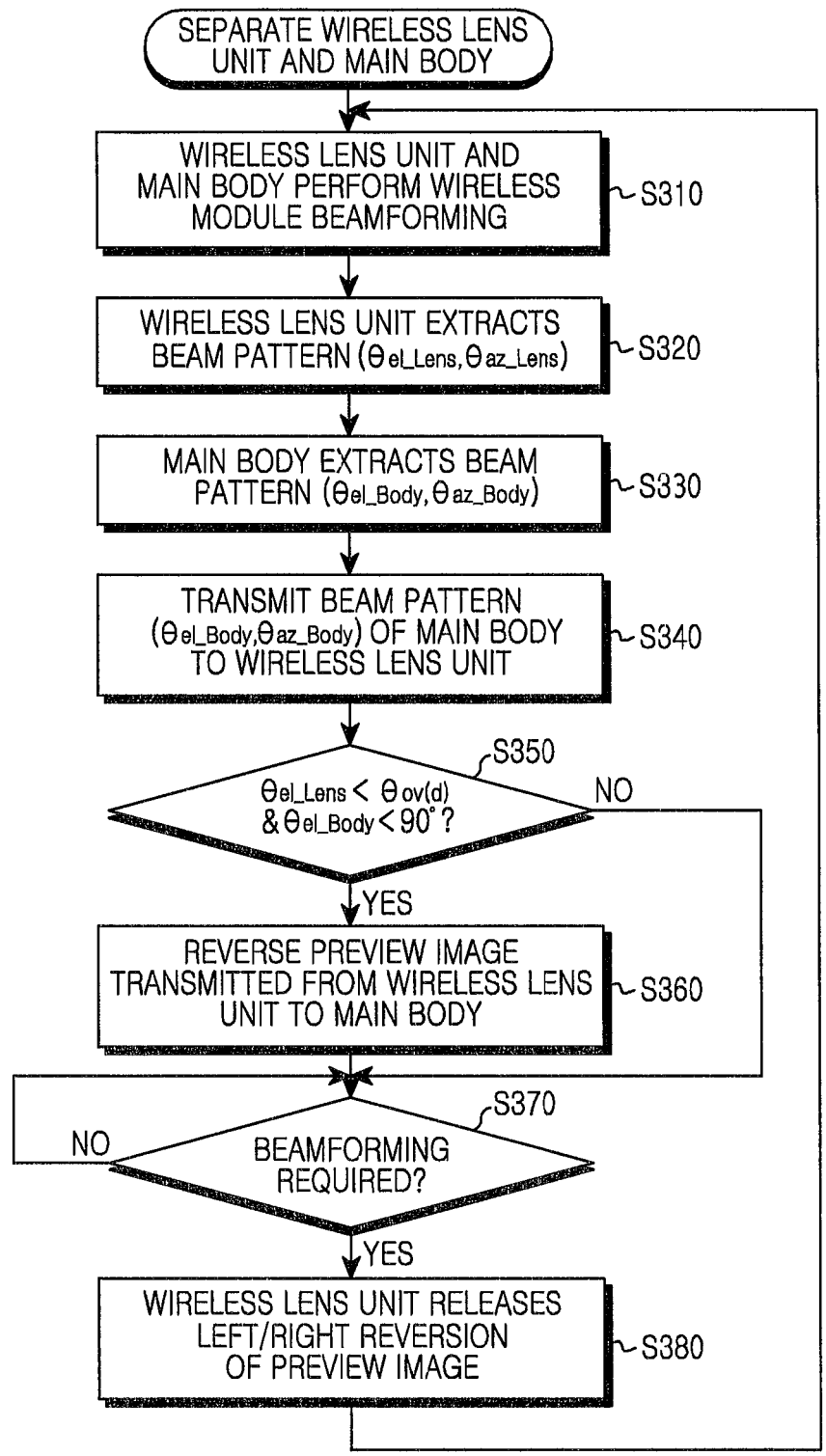
FIG. 10 illustrates a process of a shooting operation when a wireless lens unit and a main body face each other according to an embodiment of the present disclosure.
Figure 11:
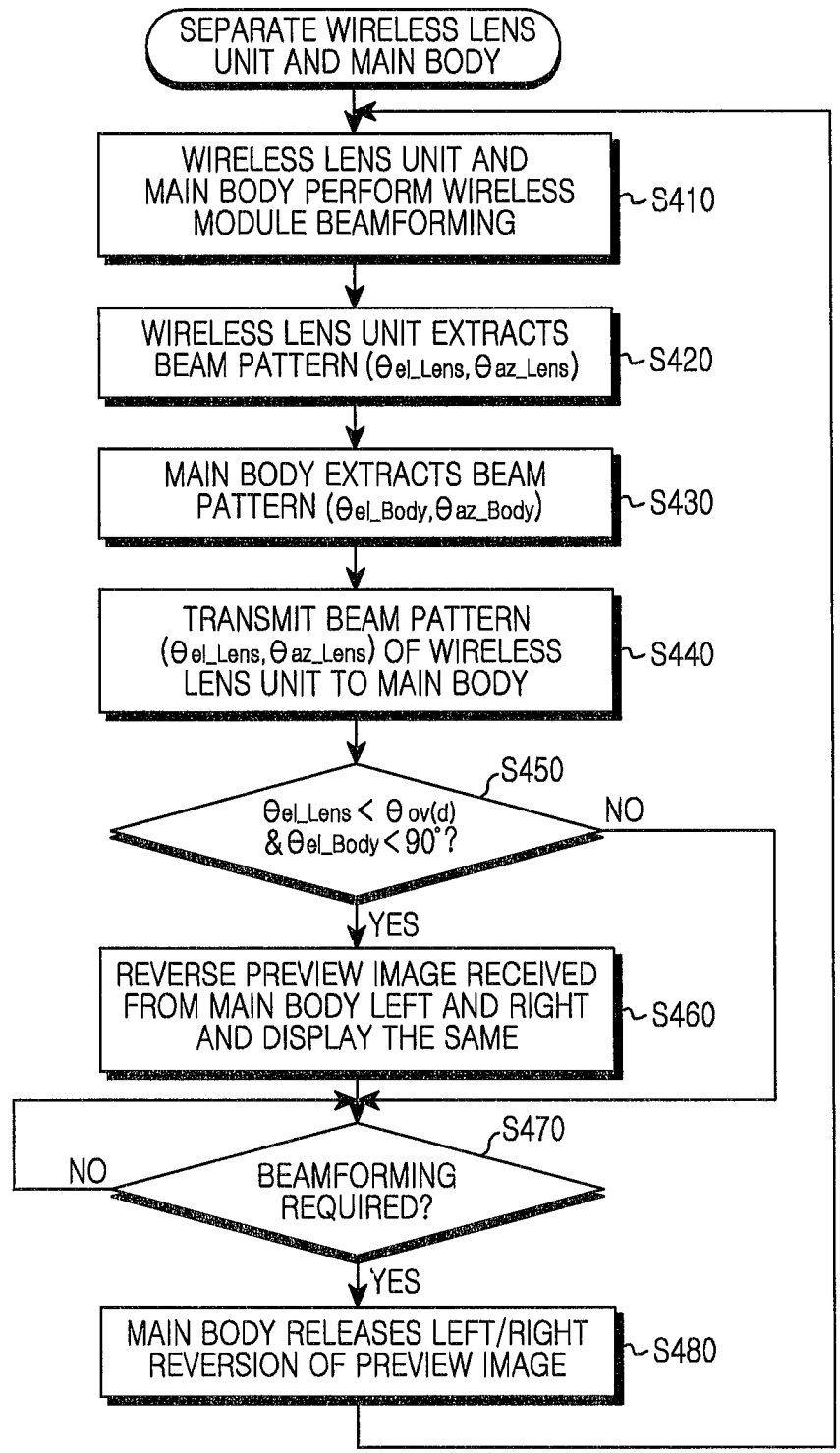
FIG. 11 illustrates a process of a shooting operation when a wireless lens unit and a main body face each other according to another embodiment of the present disclosure.

FIGS. 10 and 11 illustrate processes of a shooting operation when a wireless lens unit and a main body face each other according to an embodiment of the present disclosure. These processes correspond to flows of reversing a preview image left and right when determining that the wireless lens unit 100 and the main body 200 face each other. FIG. 10 corresponds to a flow where information regarding an elevation angle $\theta_{el\_Body}$ and an azimuth angle $\theta_{az\_Body}$ which are beam pattern information of the main body 200 are transmitted to the wireless lens unit 100, and the wireless lens unit 100 determines whether the wireless lens unit 100 and the main body 200 face each other, and when determining that the wireless lens unit 100 and the main body 200 face each other, the wireless lens unit 100 reverses a preview image left and right that is being shot by the wireless lens unit 100, and transmits the same to the main body 200. FIG. 11 corresponds to a flow where an elevation angle $\theta_{el\_Lens}$ and an azimuth angle $\theta_{az\_Lens}$ which are beam pattern information of the wireless lens unit 100 are transmitted to the main body 200, and the main body 200 determines whether the wireless lens unit 100 and the main body 200 face each other, and when determining that the wireless lens unit 100 and the main body 200 face each other, the main body 200 reverses a preview image received from the wireless lens unit 100 left and right and displays the same. The flows illustrated in FIGS. 10 and 11 are provided for an example purpose only, and other embodiments may be used without departing from the scope of the present disclosure.

Referring to FIG. 10, in block S310, the wireless lens unit 100 and the main body 200 separated from each other perform beamforming via the wireless modules 140 and 210, respectively. In block S320, the wireless lens unit 100 extracts an elevation angle $\theta_{el\_Lens}$ and an azimuth angle $\theta_{az\_Lens}$ which are optimized beam pattern information as a result of performing the beamforming. The main body 200 extracts an elevation angle $\theta_{el\_Lens}$ and an azimuth angle $\theta_{az\_Lens}$ which correspond to optimized beam pattern information as a result of performing the beamforming in block S330, and transmits the extracted beam pattern information to the wireless lens unit 100 in block S340. In block S350, the wireless lens unit 100 determines whether the wireless lens unit 100 and the main body 200 face each other based on the extracted beam pattern information of the wireless lens unit 100 and the received beam pattern information of the main body 200. That is, the wireless lens unit 100 determines whether $\theta_{el\_Lens} < \theta_{FOV}(d)$ and $\theta_{el\_Body} < 90°$. When determining that the wireless lens unit 100 and the main body 200 face each other, the wireless lens unit 100 reverses a preview image left and right, and then transmits the same to the main body 200 in block S360. After that, when determining that new beamforming is used in block S370, the wireless lens unit 100 releases the left/right reverse process for the preview image in block S380. After performing block S380, the main body 200 proceeds to block S310.

Figure 12:
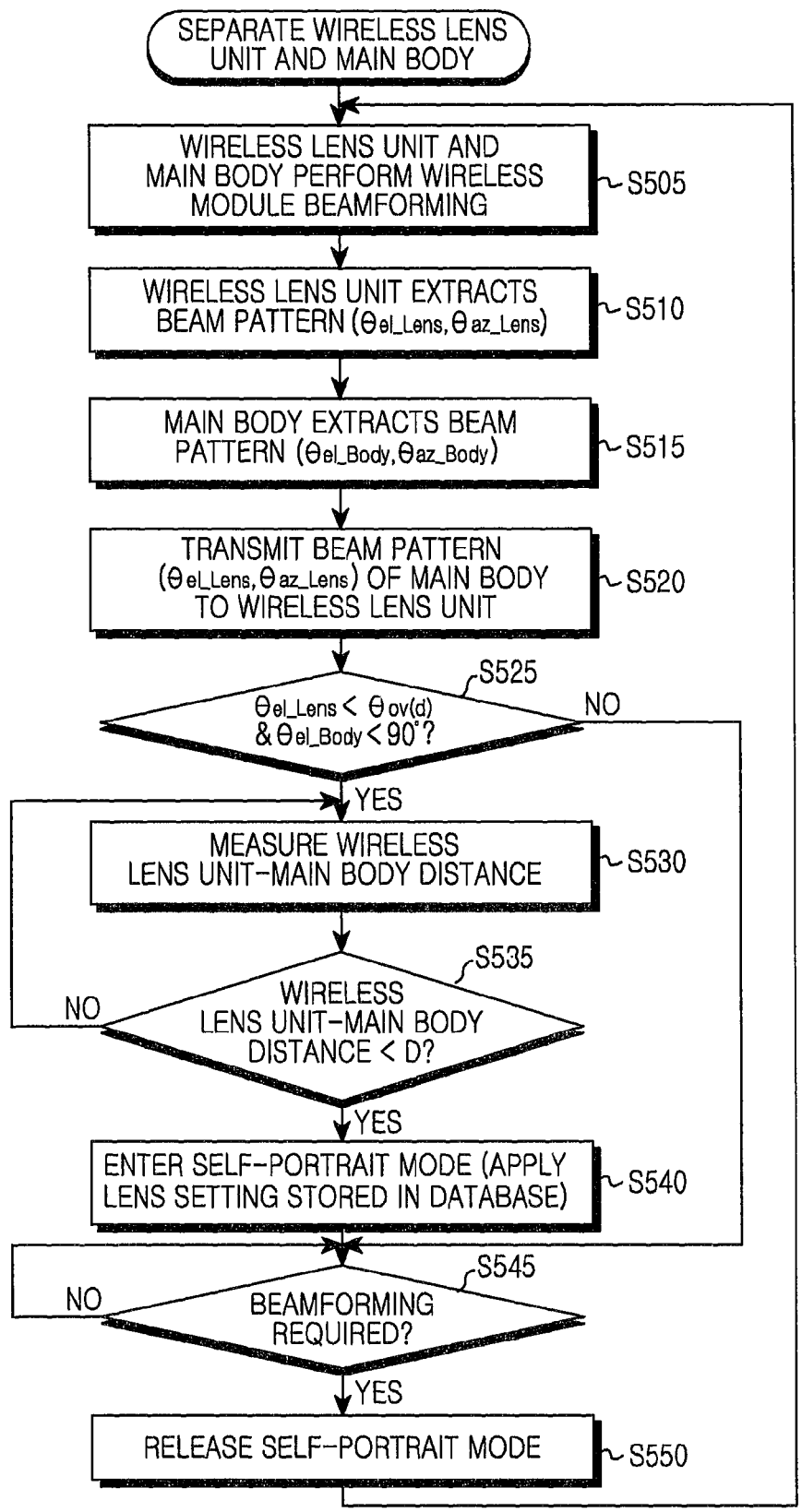
FIG. 12 illustrates a process of a self-portrait operation according to an embodiment of the present disclosure.

Referring to FIG. 11, in block S410, the wireless lens unit 100 and the main body 200 separated from each other perform beamforming via the wireless modules 140 and 210, respectively. In block S420, the wireless lens unit 100 extracts an elevation angle $\theta_{el\_Lens}$ and an azimuth angle $\theta_{az\_Lens}$ which are optimized beam pattern information as a result of performing the beamforming. The main body 200 extracts an elevation angle $\theta_{el\_Lens}$ and an azimuth angle $\theta_{az\_Lens}$ which correspond to optimized beam pattern information as a result of performing the beamforming in block S430. The wireless lens unit 100 transmits the extracted beam pattern information to the main body 200 in block S440. In block S450, the main body 200 determines whether the wireless lens unit 100 and the main body 200 face each other based on the extracted beam pattern information of the main body 200 and the received beam pattern information of the wireless lens unit 100. That is, the main body 200 determines whether $\theta_{el\_Lens} < \theta_{FOV}(d)$ and $\theta_{el\_Body} < 90°$. When determining that the wireless lens unit 100 and the main body 200 face each other, the main body 200 reverses a preview image left and right, received from the wireless lens unit 100 and displays the same on a display 250 in block S460. After that, when it is determined that new beamforming is used in block 470, the main body 200 releases a left/right reverse process for the preview image in block S480. After performing block S480, the main body 200 proceeds to block S410. FIG. 12 is a flowchart illustrating a process flow of a self-portrait operation according to an embodiment of the present disclosure. This flow corresponds to a flow when entering a self-portrait state due to movement of the wireless lens unit 100 and the main body 200. The flow illustrated in FIG. 12 is provided for an example purpose only, and other embodiments may be used without departing from the scope of the present disclosure.

Referring to FIG. 12, in block S505, the wireless lens unit 100 and the main body 200 separated from each other perform beamforming via the wireless modules 140 and 210, respectively. In block S10, the wireless lens unit 100 extracts an elevation angle $\theta_{el\_Lens}$ and an azimuth angle $\theta_{az\_Lens}$ which correspond to optimized beam pattern information as a result of performing the beamforming. The main body 200 extracts an elevation angle $\theta_{el\_Body}$ and an azimuth angle $\theta_{az\_Body}$ which correspond to optimized beam pattern information as a result of performing the beamforming in block S515, and transmits the extracted beam pattern information to the wireless lens unit 100 in block S520. In block S525, the wireless lens unit 100 determines whether the wireless lens unit 100 and the main body 200 face each other based on the extracted beam pattern information of the wireless lens unit 100 and the received beam pattern information of the main body 200. That is, the wireless lens unit 100 determines whether $\theta_{el\_Lens} < \theta_{FOV}(d)$ and $\theta_{el\_Body} < 90°$.

When it is determined that the wireless lens unit 100 and the main body 200 face each other, the wireless lens unit 100 measures a distance between the wireless lens unit 100 and the main body 200 in block S530. A distance measurement operation complies with the procedure illustrated in FIG. 5. In block S535, the wireless lens unit 100 determines whether a distance between the wireless lens unit 100 and the main body 200 is less than a distance D set for determining self-portrait. When the distance between the wireless lens unit 100 and the main body 200 is less than the distance D, the wireless lens unit 100 enters a self-portrait mode in block S540. In the self-portrait mode, the wireless lens unit 100 reads a lens setting value stored in the database 170 and applies this lens setting value to the lens 110 via the lens controller 150. For example, the lens setting value may be at least one of exposure (aperture, shutter), a digital filter effect, and auto focusing, or a combination thereof. After that, when new beamforming is used in block S545, the wireless lens unit 100 releases the self-portrait mode in block S550. After performing block S550, the wireless lens unit 100 proceeds to block S505.

As described above, according to an embodiment of the present disclosure, the wireless lens unit 100 and the main body 200 uses a millimeter wave wireless module that uses a beamforming technology as a wireless module. A relative position (direction and distance) between the wireless lens unit 100 and the main body 200 is estimated based on beam pattern information extracted via beamforming. The above-estimated information for a relative position (direction and distance) between the wireless lens unit 100 and the main body 200 is applied to shooting of a photo and a moving picture, such that convenience in manipulation may be provided to a user when the user performs shooting of a photo and a moving picture.

Though the present disclosure has been described using limited embodiments and drawings as described above, the present disclosure is not limited to the above embodiments and a person of ordinary skill in the art would modify and change variously from this description. For example, though it has been described that embodiments of the present disclosure are applied to an interchangeable-lens camera system including the wireless lens unit 100 and the main body 200 as illustrated in FIG. 1, the main body 200 may be not only a camera main body but also a smartphone having a display, a TV, a tablet computer, a laptop computer, and the like, and also the wireless lens unit 100 may be a smart camera. For another example, though it has been described that the wireless lens unit 100 is configured as illustrated in FIG. 6 and operates as flows illustrated in FIGS. 8 and 10 to 12, and the main body 200 is configured as illustrated in FIG. 7 and operates as flows illustrated in FIGS. 9 to 12 in the embodiments of the present disclosure, the scope of the present disclosure is not necessarily limited thereto. Operations according to the embodiments of the present disclosure may be implemented by a single processor. In this situation, a program instruction for performing an operation implemented by various computers may be recorded on a computer-readable medium. The computer-readable medium may include a program instruction, a data file, a data structure, and the like in an independent form or in combination. The program instruction may be things specially designed and configured for the present disclosure or known to and usable by a person of ordinary skill in the art. An example of a computer-readable recording medium includes a hard disk, a magnetic medium such as a floppy disk and a magnetic tape, an optical recording medium such as a CD-ROM and a DVD, a magneto-optical medium such as a floptical disk, and a hardware device specially configured for storing and performing a program instruction such as ROM, RAM, a flash memory, and the like An example of a program instruction includes not only a machine language code such as things generated by a compiler but also a high-level language code executable by a computer using an interpreter, and the like. Therefore, the scope of the present disclosure should not be limited and determined by the described embodiments but should be determined by not only the appended claims but also the equivalents thereof.

What is claimed is:

1. A method for operating a lens unit mountable on and detachable from a main body of a camera, the method comprising:
    determining information for a position between the lens unit and the main body based on information for a beam received from the main body; and
    obtaining an image based on the determined information for the position,
    wherein the information for the position comprises information for a direction from the lens unit to the main body.

2. The method of claim 1, wherein obtaining the image comprises:
    determining that the lens unit and the main body face each other based on the information for the position; and
    obtaining the image by reversing a left and a right of an initial image.

3. The method of claim 1, wherein obtaining the image comprises:
    determining that the lens unit and the main body face each other and a distance between the lens unit and the main body is closer than a predetermined distance;

adjusting a setting value associated with the lens unit; and
obtaining the image based on the adjusted setting value.

4. The method of claim 1, wherein determining the information for the position comprises:
extracting information for a beam of the lens unit; and
determining the direction from the lens unit to the main body based on the extracted information for the beam of the lens unit and the information for the beam of the main body.

5. The method of claim 4, wherein determining the direction comprises:
determining the direction from the lens unit to the main body based on an elevation angle of the beam of the lens unit and an elevation angle of the beam of the main body.

6. The method of claim 4,
wherein the information for the position comprises information for a distance between the lens unit and the main body.

7. A method for operating a main body of a camera system, the method comprising:
receiving data for an image obtained by a lens unit mountable on and detachable from the main body;
determining information for a position between the lens unit and the main body based on information for a beam received from the lens unit; and
converting the image to a processed image based on the information for the position,
wherein the information for the position comprises information for a direction from the lens unit to the main body.

8. The method of claim 7, wherein converting the image comprises:
determining that the lens unit and the main body face each other based on the information for the position;
generating the processed image by reversing a left and a right of the image.

9. The method of claim 8, further comprising:
displaying the processed image.

10. The method of claim 7, wherein determining the information for the position comprises:
extracting information for a beam of the main body; and
determining the direction from the lens unit to the main body based on the extracted information for the beam of the main body and the information for the beam of the lens unit.

11. The method of claim 10, wherein determining the direction comprises:
determining the direction from the lens unit and the main body based on an elevation angle of the beam of the lens unit and an elevation angle of the beam of the main body.

12. The method of claim 10,
wherein the information for the position comprises information for a
distance between the lens unit and the main body.

13. An apparatus of a lens unit mountable on and detachable from a main body of a camera, the apparatus comprising:
at least one processor configured to:
determine information for a position between the lens unit and the main body based on information for a beam received the main body; and
obtain an image based on the determined information for the position,
wherein the information for the position comprises information for a direction from the lens unit to the main body.

14. The apparatus of claim 13,
wherein the at least one processor is, in order to obtain the image, configured to:
determine that the lens unit and the main body face each other based on the information for the position; and
obtain the image by reversing a left and a right of an initial image.

15. The apparatus of claim 13,
wherein the at least one processor is, in order to obtain the image, configured to:
determine that the lens unit and the main body face each other and a distance between the lens unit and the main body is closer than a predetermined distance;
adjust a setting value associated with the lens unit; and
obtain the image based on the adjusted setting value.

16. The apparatus of claim 13,
wherein the at least one processor is, in order to determine the information for the position, configured to:
extract information for a beam of the lens unit; and
determine the direction from the lens unit to the main body based on the extracted information for the beam of the lens unit and the information for the beam of the main body.

17. The apparatus of claim 16,
wherein the at least one processor is, in order to determine the direction, configured to determine the direction from the lens unit to the main body based on an elevation angle of the beam of the lens unit and an elevation angle of the beam of the main body.

18. The apparatus of claim 16,
wherein the information for the position comprises information for a distance between the lens unit and the main body.

19. An apparatus of a main body of a camera, the apparatus comprising:
a receiver configured to receive data for an image obtained by a lens unit mountable on and detachable from the main body;
at least one processor configured to:
determine information for a position between the lens unit and the main body based on information for a beam received from the lens unit; and
convert the image to a processed image based on the information for the position,
wherein the information for the position comprises information for a direction from the lens unit to the main body.

20. The apparatus of claim 19,
wherein the at least one processor is, in order to convert the image, configured to:
determine that the lens unit and the main body face each other based on the information for the position;
generating the processed image by reversing a left and a right of the image.

21. The apparatus of claim 20, further comprising a display configured to display the processed image.

22. The apparatus of claim 19,
wherein the at least one processor is, in order to determine the information for the position, configured to:
extract information for a beam of the main body; and
determine the direction from the lens unit to the main body based on the extracted information for the beam of the main body and the information for the beam of the lens unit.

23. The apparatus of claim 22,
wherein the at least one processor is, in order to determine the direction, is configured to determine the direction from the lens unit to the main body based on an elevation angle of the beam of the lens unit and an elevation angle of the main body.

24. The apparatus of claim 22,
wherein the information for the position comprises information for a distance between the lens unit and the main body.

* * * * *